(12) United States Patent
Zimmer

(10) Patent No.: US 7,281,293 B2
(45) Date of Patent: Oct. 16, 2007

(54) WINDSHIELD WIPER DEVICE, IN PARTICULAR, FOR A MOTOR VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 10/427,091

(22) Filed: Apr. 30, 2003

(65) Prior Publication Data

US 2004/0045115 A1    Mar. 11, 2004

(30) Foreign Application Priority Data

Sep. 11, 2002   (DE)   ................................ 102 42 114

(51) Int. Cl.
*B60S 1/34*  (2006.01)
(52) U.S. Cl. .................. 15/250.34; 15/250.31
(58) Field of Classification Search ............ 15/250.31, 15/250.3, 250.34
See application file for complete search history.

(56) References Cited

U.S. PATENT DOCUMENTS 3,085,821 A * 4/1963 Ryck ........................... 403/26
3,268,199 A * 8/1966 Kordyban et al. .......... 220/632
3,790,985 A * 2/1974 Kessler ..................... 15/250.34
3,910,652 A  10/1975 Riester et al. .............. 384/125
6,216,309 B1 * 4/2001 Goto et al. .............. 15/250.31
6,554,477 B1 * 4/2003 Zimmer ..................... 384/130
6,568,023 B2 * 5/2003 Perin et al. ................ 15/250.3
6,595,502 B2 * 7/2003 Koch et al. ................. 267/139
6,845,540 B1 * 1/2005 Bissonnette et al. ..... 15/250.31

FOREIGN PATENT DOCUMENTS

DE     199 03 140 A1   8/1999
EP       0 015 172 A1   9/1980
GB       2 327 598 A    2/1999

* cited by examiner

*Primary Examiner*—Gary K. Graham
(74) *Attorney, Agent, or Firm*—Michael J. Striker

(57) ABSTRACT

A windshield wiper device (10), in particular, for a motor vehicle, includes a wiper bearing (14), which includes a bearing housing (24), a wiper shaft 922), which is supported in the bearing housing (24) and which supports a wiper arm (28) on a first end (26), and an element (42) that axially secures the wiper shaft (22). The element (42) includes at least one region that is made from a foam material.

3 Claims, 5 Drawing Sheets

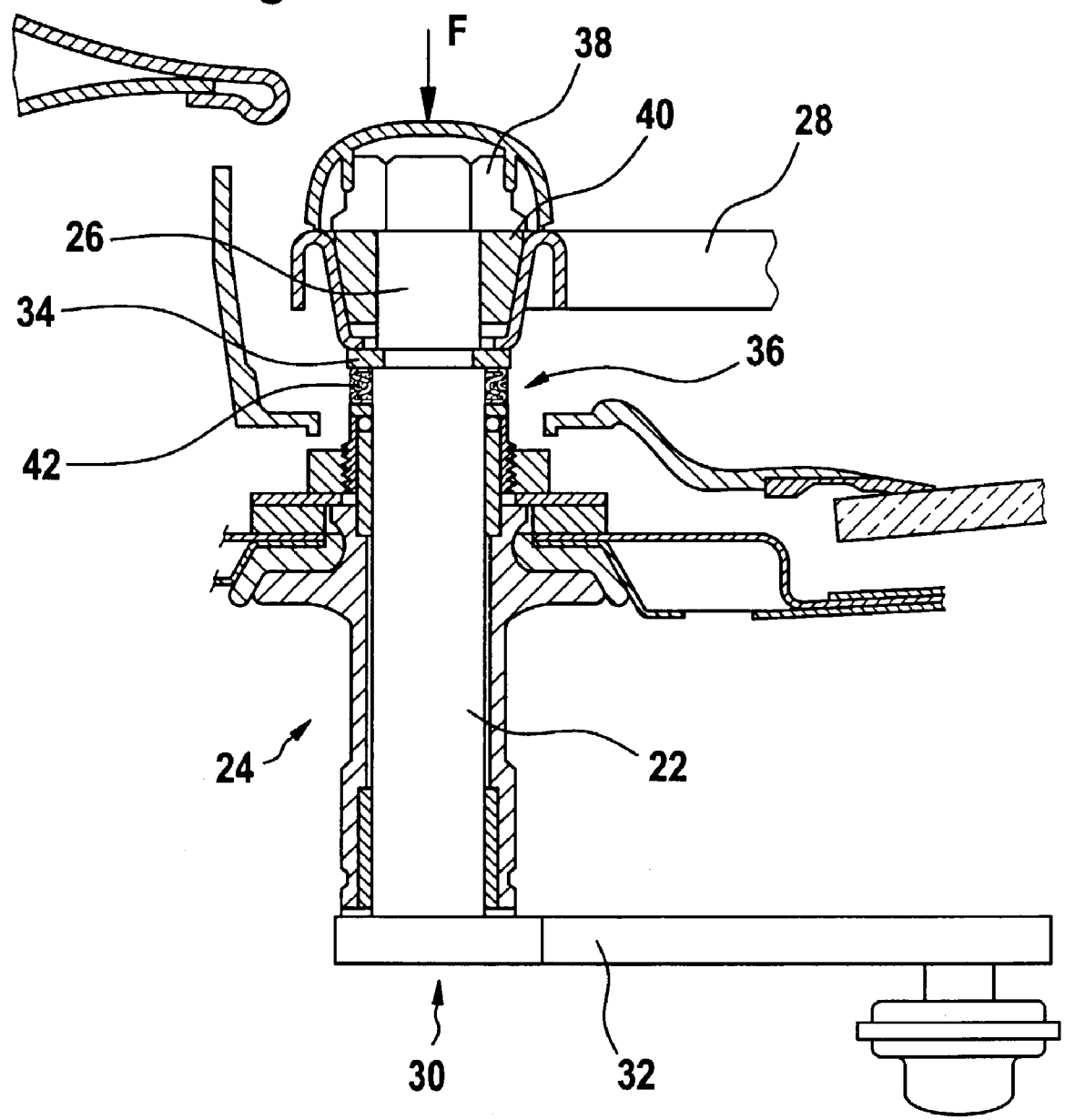

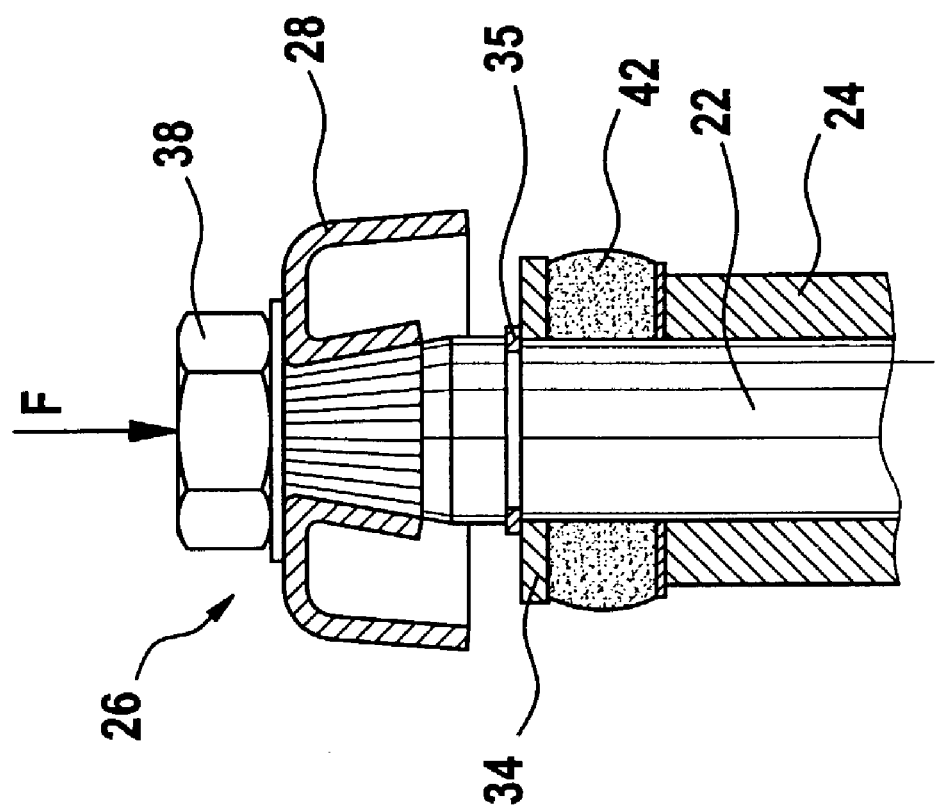
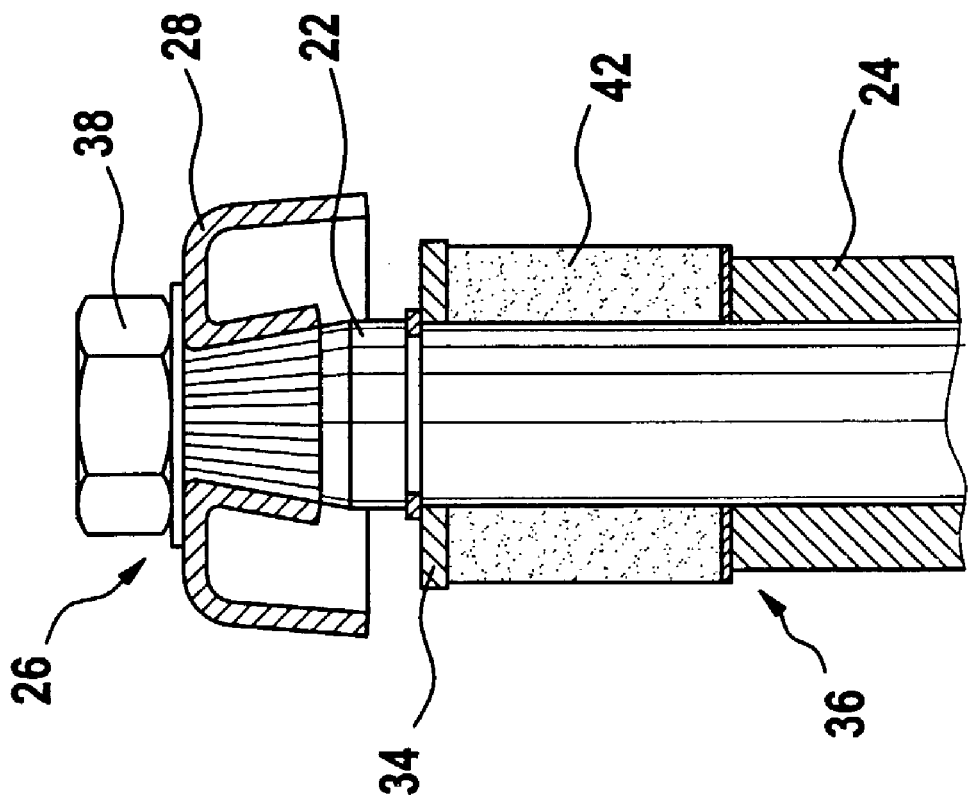

WINDSHIELD WIPER DEVICE, IN PARTICULAR, FOR A MOTOR VEHICLE

CROSS-REFERENCE

The invention described and claimed hereinbelow is also described in DE 102 42 114.5, filed Sep. 11, 2002. This German Patent Application, whose subject matter is incorporated here by reference, provides the basis for a claim of priority of invention under 35 U.S.C. 119 (a)-(d).

BACKGROUND OF THE INVENTION

The present application relates to a windshield wiper device for a motor vehicle.

Numerous windshield wiper devices are known, for example, from DE 199 03 140 A1, which have a wiper bearing, which includes at least one bearing housing, in which a wiper shaft is support and axially secured by means of an element, which supports a wiper arm on a first end. The axial fixing is therefore of the type that the element, upon an action of force on the wiper arm or on the first end of the wiper shaft, is deformed under energy absorption. If a pedestrian contacts the wiper arm or wiper shaft in the event of an accident, the wiper arm or shaft can be advanced backward, whereby the pedestrian can be less seriously injured. Because the element absorbs energy, in addition, the situation in which the pedestrian impacts the vehicle body with the entire energy is avoided by means of the backward advancement of the wiper arm. In this connection, the elements are arranged in a row of thin-walled, plate-shaped, sheet-metal sleeves, which for example, also can have a corrugated region. These types of elements, however, are elaborate and cost-intensive to manufacture.

SUMMARY OF THE INVENTION

The windshield wiper device of the present invention has the advantage that by means of the structure of the element from foam material, a very cost-effective, operative, and simple to dimension possibility of a pedestrian impact protection for windshield wiper devices is provided. In addition, the foam material achieves a particularly good energy absorption, whereby an impacted pedestrian is better protected.

Particularly advantageous is when the element is arranged such that upon the action of a force, which is greater than a predetermined maximum force, the wiper shaft is deformable in an axial direction on the first end of the wiper shaft, in particular, it is compressible. In this manner, the energy upon impact is particularly well absorbed.

In a particularly simple and cost-effective embodiment, the element is arranged between the bearing housing and a projection on the wiper shaft.

Particularly advantageous, then, is if the projection is disk-shaped and includes the wiper shaft, so that the energy from the wiper shaft can be dispensed on a large surface region of the element.

Further, in a simple variation, the projection is formed as one piece with the wiper shaft.

In addition, it is advantageous if the element is formed substantially rotationally symmetrical, in particular, as a hollow cylinder, hollow cone, or hollow sphere, and the wiper shaft is arranged in the center of the element. In this manner, also by angular impact, optimal energy absorption is permitted. Further, only a little more structural space is used.

One form of the element made of metallic foam, in particular, aluminum foam, is particularly corrosion-resistant and durable.

If the wiper arm is secured to a first end of the wiper shaft by means of an attachment element and the attachment element, under deformation of the element, is displaceable relative to the wiper arm, then the wiper shaft also can be advanced backward, when the wiper arm itself is already impacted on the vehicle body, for example, and can not be further displaced backward.

In the simplest form, the element is hereby arranged between the wiper arm and the attachment element.

A particularly holdable element is thereby achieved, in that a foam core is provided, which is provided with cover elements, in particular, cover sheets, as a sandwich construction.

BRIEF DESCRIPTION OF THE DRAWINGS

FIG. 2 shows a schematic section through a wiper bearing, according to the present invention, before a force effect;

FIG. 3 shows a schematic section through a wiper bearing of FIG. 2 in one variation;

FIG. 4 shows a schematic section through a wiper bearing after an impact as a force effect;

DETAILED DESCRIPTION OF THE PREFERRED EMBODIMENTS

Figure 1:
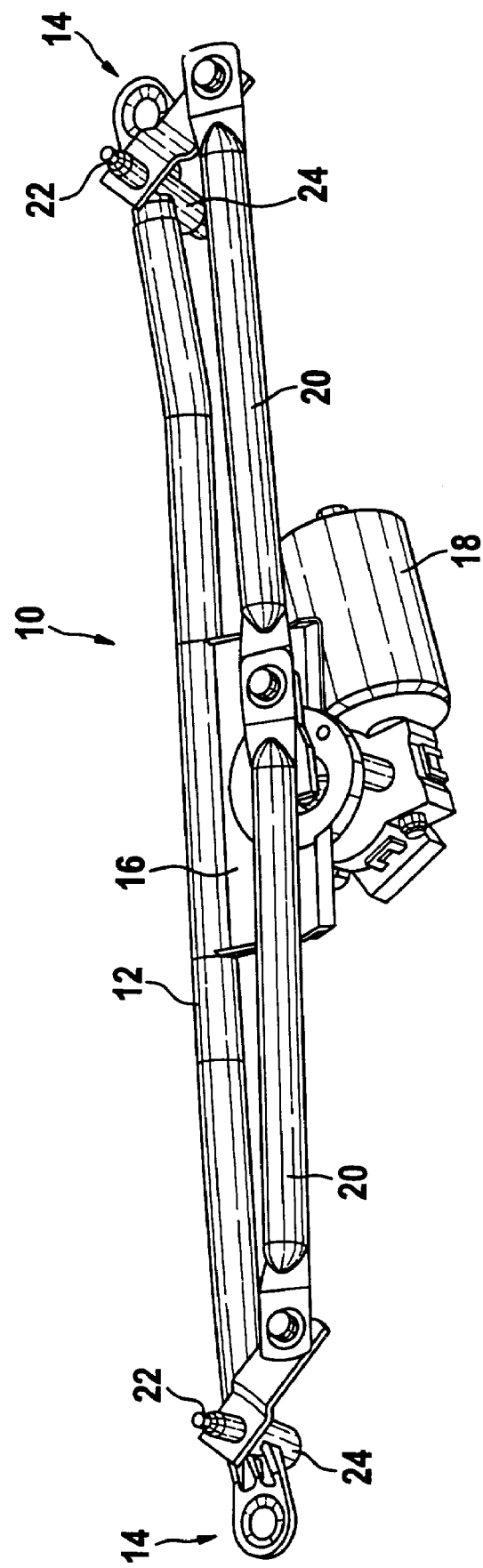
FIG. 1 shows a windshield wiper device of the present invention in a perspective view.

FIG. 1 shows a windshield wiper device 10 according to the present invention in a perspective view. This includes essentially a support tube 12, which supports a wiper bearing 14, respectively, on the ends of its longitudinal extension.

In addition, a motor support 16 is attached on the support tube 12, which supports a wiper motor 18. This wiper motor 18 drive the wiper shafts 22 via connecting rods 20, which are supported in the bearing housings 24 of the wiper bearing 14.

In FIG. 2, a wiper bearing 14 of the inventive windshield wiper device 10 is shown in detail in a schematic cross section.

The wiper shaft 22 is supported in a bearing housing 24 of the wiper bearing 14. It has a first end, which is non-rotatably connected with a wiper arm 28 (here, shown only partially). On the other end 30 of its longitudinal extension, the wiper shaft 22 is non-rotatably connected with a drive crank 32, which, in turn, is flexibly connected with the connecting rod 20 (FIG. 1). The wiper shaft 22 further has a projection 34, which is formed as a disk and is axially fixed on the wiper shaft 22. The projection 34 can be formed as one-piece with the wiper shaft 22 or, for example, also can be formed as an attached disk, which is axially fixed at least in the direction of the wiper arm 28 by means of a snap ring 35.

The wiper shaft 22 projects from the front wall 36 of the bearing housing 24 and has a threaded region on its first end 26, on which an attachment element 38, formed as a screw nut, is screwed for attachment of the wiper arm 28. Depending on the structure of the wiper arm 28, an additional attachment connection 40 is arranged between the attachment element 38 and the wiper arm 28.

Between the front wall 36 of the bearing housing 24 and the projection 34 of the wiper shaft 22, an element 42 is arranged. This element 42 is made from aluminum foam and essentially has a hollow cylinder form, whose height is selected to correspond to the displacement movement. This element 42 is suspended on the wiper shaft 22, so that upon a force effect F on the first end 25 of the wiper shaft 22, it is pressed together. In this manner, the element 42 is selected such that the compression first occurs upon exceeding of a predetrmined maximum force MK. Furthermore, the foam material of the element 42 is selected such that upon a force effect F, like that which is typically produced with the impact of a pedestrian on the wiper shaft 22, a known energy quantity is dissipated. In this manner, energy can be absorbed by the windshield wiper device 10, so that the pedestrian does not impact with his entire energy of movement on the vehicle body.

In FIG. 3, the first end 26 of a wiper shaft 22 of the windshield wiper device 10 of the present invention is shown in detail. The wiper shaft 22 is supported in the bearing housing 24 and supports the wiper arm 38 on its first end 26. Thus, the wiper shaft 22 has a knurled cone on its first end, which is terminated by a threaded region. The wiper arm 28 is attached on the knurled cone and non-rotatably connected with the attachment element 38, here, formed as a screw nut. On its side connected to the bearing housing 24, the wiper shaft 22 has a projection 34 in the region of its first end 26, which is formed here as a circular disk, whose inner diameter corresponds essentially to the outer diameter of the wiper shaft 22. The disk 34 is fixed by means of the snap ring 35, which engages in a peripheral groove of the wiper shaft 22. The element 42 made from foam material, here, from foamed aluminum, is shown around the wiper shaft 22 between the front wall 36 of the bearing housing 24 and the disk 34. In this manner, the wiper shaft 22 is fixed practically without any axial play in the bearing housing 24.

In FIG. 4, the first end 26 of the wiper shaft 22 is shown after a crash, that is, after a force effect F on the first end 26, in the direction of the bearing housing 24. In this manner, the wiper shaft 22 was displaced in the direction of the bearing housing 24, whereby the element was compressed under energy absorption.

Figure 6:
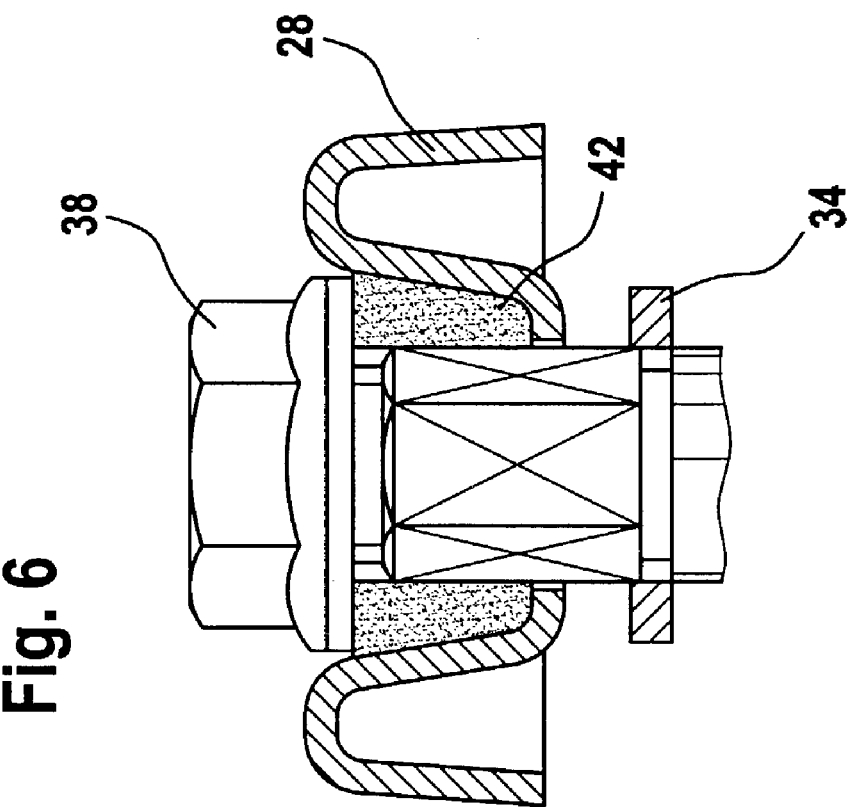
FIG. 6 shows a schematic section through a first end of a wiper shaft after an impact.
Figure 5:
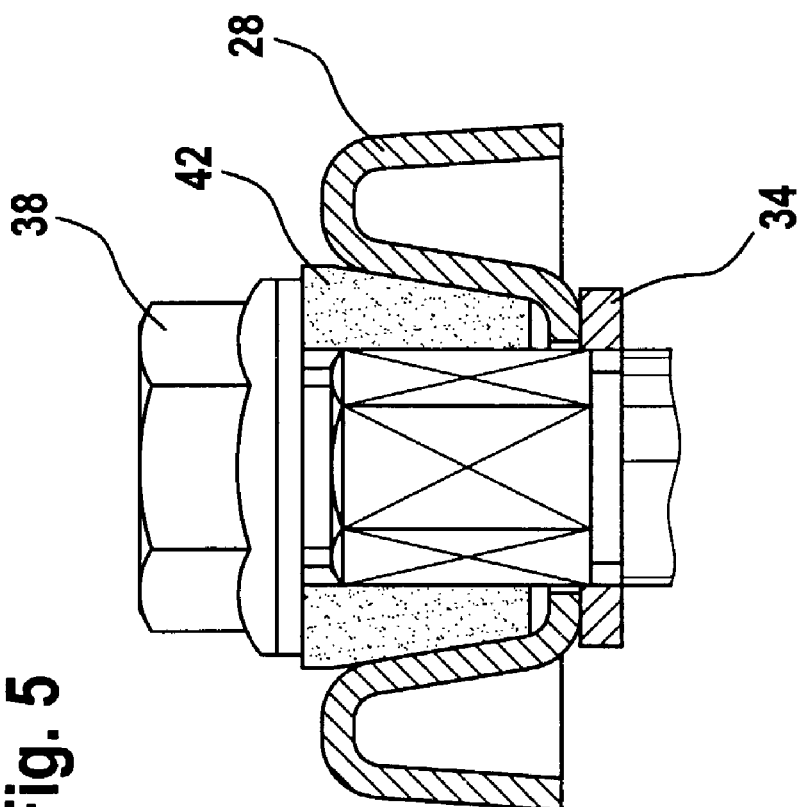
FIG. 5 shows a schematic section through the end of a wiper shaft with a wiper arm before an impact.
Figure 7:
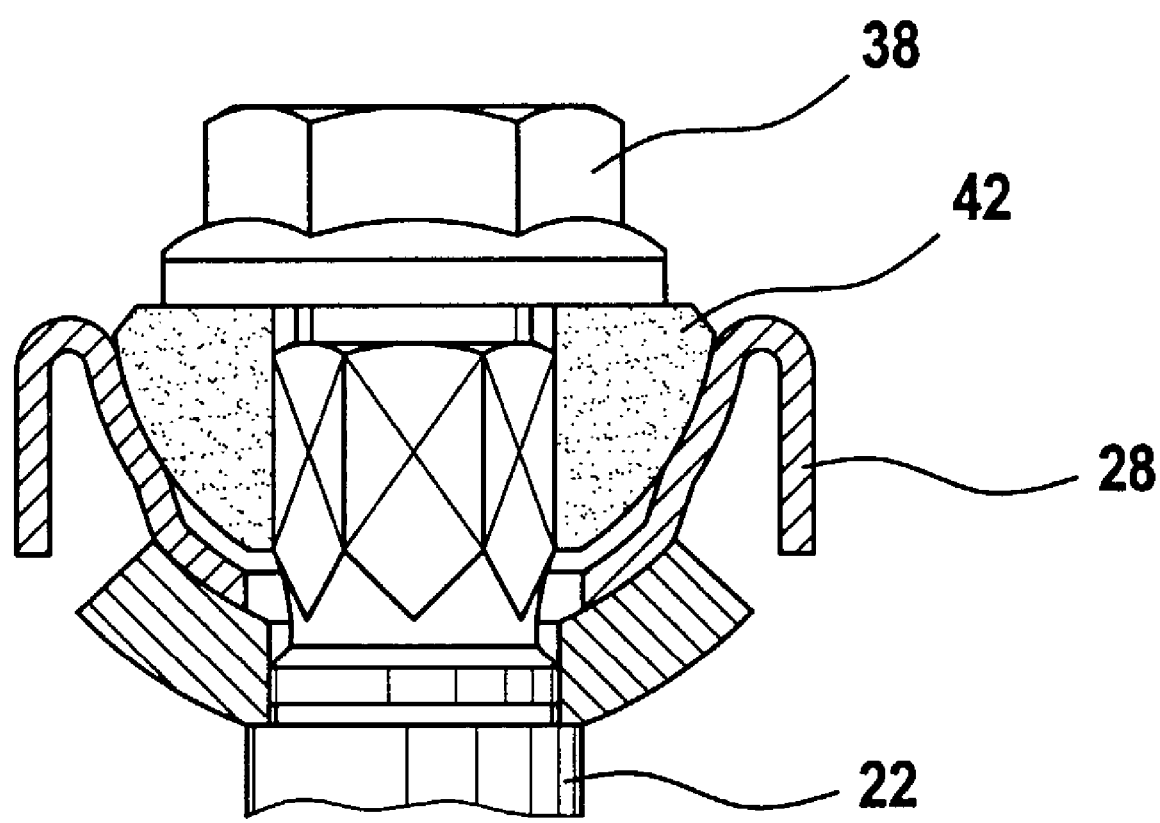
FIG. 7 shows a schematic section through wiper shaft according to FIG. 5 in one variation.

In FIG. 5, one variation of the invention is shown. Here, the element 42, as an attachment connection 40 (FIG. 2), is arranged between the attachment element 38 and the wiper arm 28. In this manner, the element 42 is arranged such that when the wiper arm 28 is no longer displaceable in the direction of the bearing housing 24, the attachment element 38 can be drawn back or still be displaced in the direction of the bearing housing 24. In this manner, the wiper shaft 22 slides the wiper shaft 22 together with the attachment element 38 under compression of the element 42 in the direction of the bearing housing 24. This is shown in FIG. 6. In extreme cases, the attachment element 38 can be partially or completely disappeared into the wiper arm 28.

To further increase of the compression path, the wiper arm also can be disposed via a calotte-shaped mounting, so that the element 42 can be spherical and the attachment element 28, in the event of an impact, that is a force effect F, can be accommodated in the direction of the bearing housing 24 in the interior of the wiper arm 28.

In one variation of the invention, the foam material also can be arranged on the other end 30 of the wiper shaft 20. In this manner, it also can be provided that the element 42 is loaded not from compression, rather from expansion, that is, from tension.

It will be understood that each of the elements described above, or two or more together, may also find a useful application in other types of constructions differing from the types described above.

While the invention has been illustrated and described herein as a windshield wiper device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper device (10) for a motor vehicle, with at least one wiper bearing (14), which includes a bearing housing (24), a wiper shaft (22), which is supported in the bearing housing (24) and which supports a wiper arm (28) on a first end (26), and an element (42), which axially secures the wiper shaft (22), wherein the element (42) is formed from a metallic foam material, wherein the wiper arm (28) is attached by means of an attachment element (38) on the first end (26) of the wiper shaft (22) and the attachment element (38) is displaceable under deformation of the element (42) relative to the wiper arm (28).

2. The windshield wiper device (10) according to claim 1, wherein the element (42) is arranged between the wiper arm (28) and the attachment element (38).

3. The windshield wiper device (10) according to claim 1, wherein the element (42) is formed from at least one foam core with cover elements, in particular, cover sheets.

* * * * *